United States Patent
Baer et al.

(10) Patent No.: US 9,747,730 B2
(45) Date of Patent: *Aug. 29, 2017

(54) DRIVER MEASUREMENT AND INCENTIVE SYSTEM FOR IMPROVING FUEL-EFFICIENCY

(71) Applicant: LinkeDrive, Inc., Boston, MA (US)

(72) Inventors: Jeffrey C. Baer, Dover, MA (US); Daniel J. Sullivan, Pembroke, MA (US); Matthew J. Geiger, Worcester, MA (US)

(73) Assignee: LinkeDrive, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/851,956

(22) Filed: Sep. 11, 2015

(65) Prior Publication Data

US 2016/0133065 A1    May 12, 2016

Related U.S. Application Data

(63) Continuation of application No. 13/952,822, filed on Jul. 29, 2013, now Pat. No. 9,135,759.

(60) Provisional application No. 61/676,907, filed on Jul. 28, 2012.

(51) Int. Cl.
G06F 7/00 (2006.01)
G07C 5/08 (2006.01)
G01C 21/34 (2006.01)

(52) U.S. Cl.
CPC ........... *G07C 5/08* (2013.01); *G01C 21/3469* (2013.01); *G07C 5/0816* (2013.01)

(58) Field of Classification Search
CPC ..... G07C 5/08; G07C 5/0816; G01C 21/3469
USPC .......................................... 701/51, 99, 123
See application file for complete search history.

(56) References Cited

U.S. PATENT DOCUMENTS

| 4,247,757 A * | 1/1981 | Crump, Jr. .......... B60R 16/0236 235/61 J |
| 7,389,178 B2 | 6/2008 | Raz et al. |
| 7,561,054 B2 | 7/2009 | Raz et al. |
| 9,135,759 B2 * | 9/2015 | Baer ....................... G07C 5/08 |
| 2010/0245064 A1 | 9/2010 | Fleishman |
| 2011/0054768 A1 | 3/2011 | Sullivan |

* cited by examiner

*Primary Examiner* — Gertrude Arthur Jeanglaude
(74) *Attorney, Agent, or Firm* — David H. Judson

(57) ABSTRACT

A vehicle driver is provided with a display interface a smartphone, tablet, PC, or any telematics or in-vehicle device installed in the vehicle. The display interface presents a real-time target for the driver to follow to maximize fuel economy and safety, achieved by modulating the accelerator pedal appropriately.

9 Claims, 5 Drawing Sheets

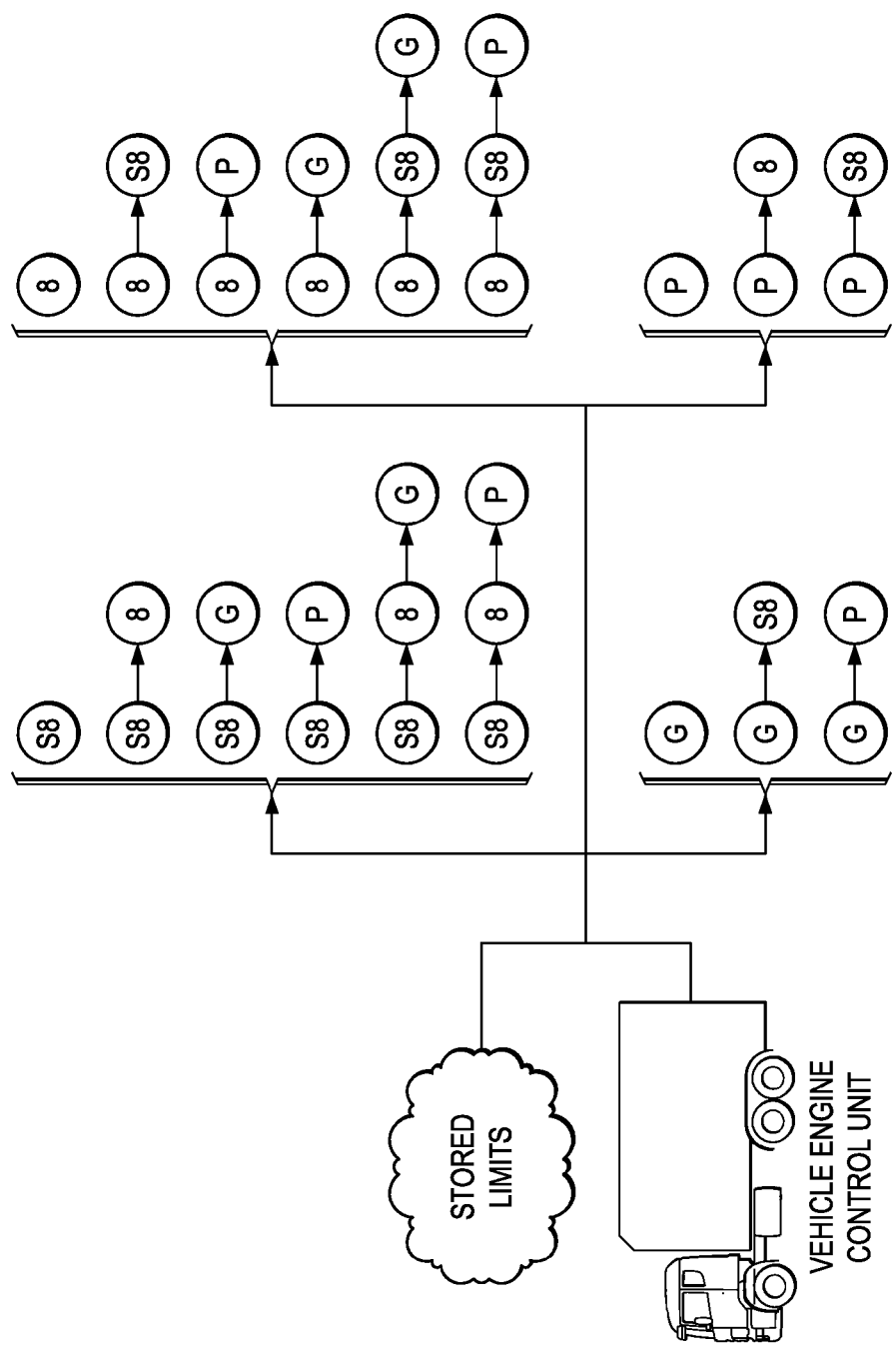

DRIVER MEASUREMENT AND INCENTIVE SYSTEM FOR IMPROVING FUEL-EFFICIENCY

BACKGROUND

Technical Field

This disclosure relates generally to applications and methods that may be implemented in or using a mobile device to teach, measure and reward motor vehicle drivers to operate their vehicles in a fuel-efficient and safe manner.

Background of the Related Art

Mobile devices, such as a smartphone or tablet, have become ubiquitous in today's society. Faster processors, more memory, higher quality gesture-based multi-touch screens, availability of mobile broadband data, and integration of multi-media and GPS chips along with open interface mobile operating systems, have opened the door for creation of a large variety of mobile applications.

With the price of fuel hovering around $4 per gallon in the US, fuel has grown to be one of the largest costs of running a vehicle. Most commercial fleets consider fuel to be over 35% of operating expenses. As fuel prices continue to increase, this challenge becomes even greater. Commercial fleets are most competitive when they are best at overall freight efficiency, which is largely enabled by managing fuel cost.

Alternative vehicle technologies (truck-level features to improve aerodynamics, decrease rolling resistance, C/L NG engines and hybrid/electric drivetrains) are currently offered to fleet owners and managers to help control the fuel costs. These solutions are expensive but somewhat effective in increasing fuel mileage and therefore lowering fuel costs. These capital intensive solutions drive a challenging return on investment (ROI) and an extended payback period to the fleet operator. Furthermore, these solutions are ignoring a potentially simpler opportunity, namely, changing driver behavior to improve fuel mileage. Fleets and OEM's agree on a difference of more than 30% in fuel mileage between a fleet's best and worst driver with respect to MPG. Furthermore, drivers with low MPG's tend to have a higher accident rate.

Additionally, and another challenge, is that the profession of truck driving is rife with high turnover, as many drivers opt to move to a new fleet once a year or more, chasing a better route, better pay, or improved lifestyle.

Of course, the challenge of changing driver behavior to improve efficiency very likely pre-dates the internal combustion engine. Highly-skilled "teamsters" managed draft animals to maximize freight efficiency. Since those days, there have been primarily two tools utilized to improve driver behavior and efficiency, namely, education and incentive programs. For example, many fleets send all drivers to training on a regular basis to improve techniques for efficient driving. Others offer fuel mileage or other bonuses for good behavior and results. Both programs find limited success. Education and training programs are costly and the benefits tend to wane over time, or drivers move on to a different fleet; incentives and bonuses tend to reward the top tier of drivers, and if a driver knows he/she will not receive it, they refuse to try.

Most modern trucks have a fuel mileage gauge in-dash. The most sophisticated of these gauges report instantaneous mpg, average mpg, and trending details in some graphical format. These gauges are somewhat effective in improving a driver's fuel mileage, however, they are by nature hindward looking and are generally providing negative feedback. For example, when the driver begins a journey, the fuel economy value is often as "good as it will get" and declines as the driver is faced with externalities beyond his or her control (i.e. traffic jams, rerouting, truck maintenance issues, hills, etc). This is frustrating and discouraging to the driver, and human tendency in these instances is to disregard, turn-off, or look away from the gauge. Furthermore, the industry generally recognizes a 15-20% error in reading the fuel mileage from the Engine Control Unit. Socha significant inaccuracy makes it difficult to know if the driver is doing better or worse than the previous journey, mile, or minute. In-dash and other MPG gauges use ECU calculation of mileage and are therefore neither accurate nor precise.

Since the advent of cellular and mobile technologies, the "telematics" industry has evolved into a mature market with many solutions and key players (Qualcomm, PeopleNet, Telogis, Xata, and others). Their solutions primarily offer truck-specific GPS routing, navigation, compliance with FMCSA and NHTSA legislation (such as Hours of Service, Electronic On-Board Recording, and Compliance, Safety and Accountability (CSA)) and back-office integration with accounting, payroll, and fuel tax reporting. These incumbent technologies are just now beginning to extend their solutions to help "change driver behavior to improve fuel economy". As of today, their driver behavior solutions are limited to anti-speeding and anti-idling programs, with a monthly driver scorecard. For example, they set targets (no speed violations, X% of time spent idling), measure, and report to the driver their performance on a periodic basis (usually monthly).

There also exists a solution targeting improving driver safety, known as GreenRoad. This is a dash-mounted device that uses an array of accelerometers, a red-yellow-green light and a mobile data connection. When a driver maneuver exceeds a certain threshold as measured by the accelerometers, the light changes, from green to yellow, and then to red, in a progressive fashion. This real-time feedback attempts to limit hard acceleration/deceleration and hard cornering, which have been directly correlated to increased rate of safety incidents. GreenRoad has also recognized that limiting hard acceleration and deceleration events leads to improved fuel mileage. The fleets have access to an online reporting system that can be used by the fleet manager to train drivers.

BRIEF SUMMARY

According to an embodiment, computer program code is executed by a host computing device (e.g., a mobile device) having a display for the purpose of coaching an operator of a vehicle to operate the vehicle in a fuel-efficient manner. The program code is operative to generate a display interface (e.g., a simulation of a gauge) identifying two or more target zones, and a display pointer. The target zones are defined by a baseline that represents a set of zero acceleration fuel rate versus vehicle speed data points, the baseline being generated for a given vehicle class of which the vehicle is a member. The baseline may be adjusted based on environmental data (e.g., time of day, temperature, hill detection, altitude, current weather, route grade changes from topological maps, and the like) and/or historical data (e.g., driver history, vehicle history, or the like). The program code is further operative to receive data (e.g., vehicle speed, engine load, engine speed, fuel rate, transmission gear value, mass air flow, and the like) generated during operation of the vehicle; in response, the program code is further operative to generate, continuously, values representing a current fuel rate. The program code converts these values to control signals that drive the display pointer with respect to the two or more target zones to provide visual feedback of current fuel rate against the baseline. The visual feedback seeks to force the operator to operate the vehicle in such a manner so as to maintain the display pointer in a given position with respect to the baseline, thereby increasing the overall fuel-efficiency.

The foregoing has outlined some of the more pertinent features of the subject matter. These features should be construed to be merely illustrative.

BRIEF DESCRIPTION OF THE DRAWINGS

For a more complete understanding of the disclosed subject matter and the advantages thereof, reference is now made to the following descriptions taken in conjunction with the accompanying drawings, in which:

FIG. 6 illustrates how various algorithms may be used to calculate target variables (e.g., fuel rate, air mass, or the like) according to this disclosure.

DETAILED DESCRIPTION

The disclosed method may be practiced in association with a computing infrastructure comprising one or more data processing machines.

Figure 1:
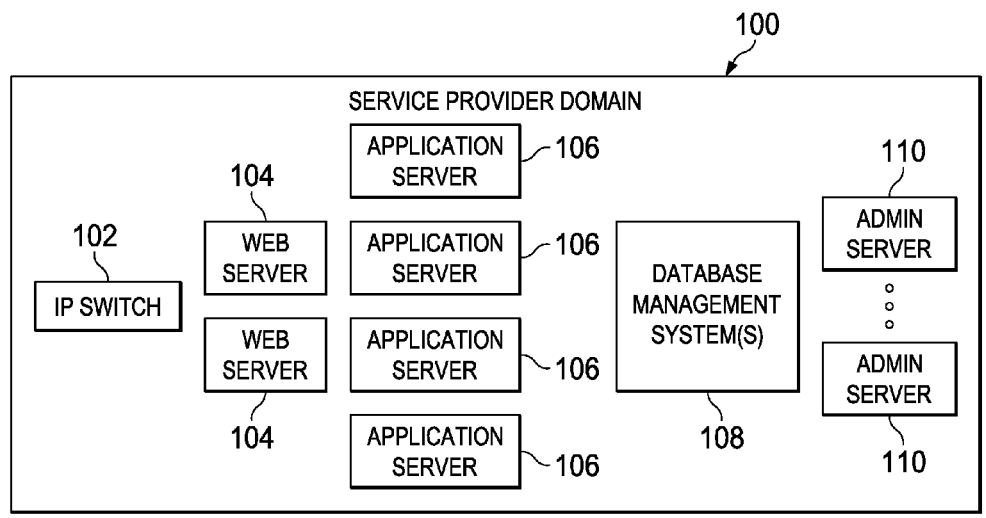
FIG. 1 is a block diagram of a driver measurement and incentive service provider infrastructure according to this disclosure.

A representative computing infrastructure provides a driver measurement and incentive service for improving fuel-efficiency. A representative service of this type is PedalCoach™ provided by LinkeDrive of Boston, Mass. This type of service (in whole or in part) may be implemented on or in association with a service provider infrastructure 100 such as seen in FIG. 1. A representative infrastructure of this type comprises an IP switch 102, a set of one or more web server machines 104, a set of one more application server machines 106, a database management system 108, and a set of one or more administration server machines 110. Without meant to be limiting, a representative technology platform that implements the service comprises machines, systems, sub-systems, applications, databases, interfaces and other computing and telecommunications resources. A representative web server machine comprises commodity hardware (e.g., Intel-based), an operating system such as Linux, and a web server such as Apache 2.x (or higher). A representative application server machine comprises commodity hardware, Linux, and an application server such as WebLogic 9.2 (or later). The database management system may be implemented as an Oracle (or equivalent) database management package running on Linux. The infrastructure may include a name service, FTP servers, administrative servers, data collection services, management and reporting servers, other backend servers, load balancing appliances, other switches, and the like. Each machine typically comprises sufficient disk and memory, as well as input and output devices. The software environment on each machine includes a Java virtual machine (JVM) if control programs are written in Java. Generally, the web servers handle incoming requests, and they export web pages (or the like) or other content. The application servers manage the basic functions of the service including, without limitation, business logic.

One or more functions of such a technology platform may be implemented in a cloud-based architecture. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a standalone machine, or across a distributed set of machines.

The front-end of the above-described infrastructure is also representative of a conventional network-accessible web site or web service. This site or service provides a software application that executes in a mobile device to provide the in-vehicle "coaching" functionality of this disclosure, as will be described below.

More generally, client (vehicle driver-side) devices access the service provider infrastructure via a network (e.g., the public Internet, a private or dedicated network, or any combination) to provide data, and to retrieve content, including HTML, media players, video content, and other objects. A typical client device is a personal computer, laptop, mobile device, tablet, or the like. A representative mobile device is an Apple iPad® or iPad2, iPad Mini, an Android™-based smartphone or tablet, a Windows®-based smartphone or tablet, or the like. A device of this type typically comprises a CPU (central processing unit), computer memory, such as RAM, and a flash drive. The device software includes an operating system, and generic support applications and utilities.

Figure 2:
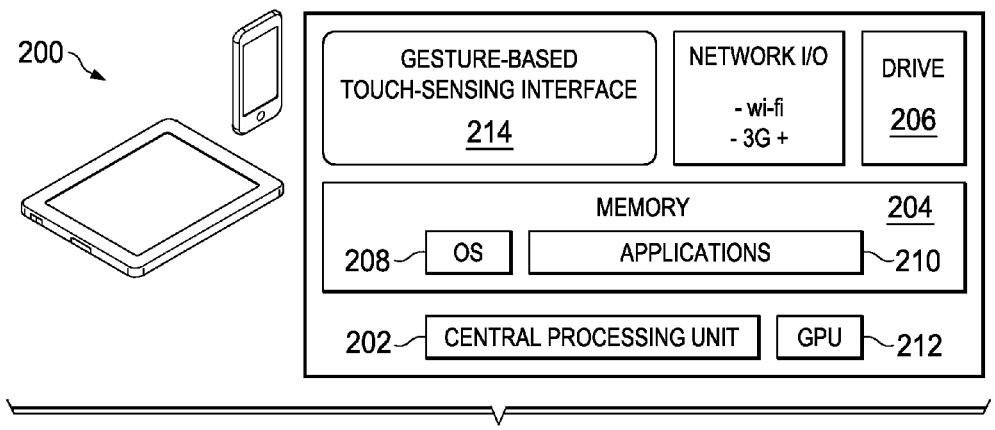
FIG. 2 is a representative client-side (mobile) device that executes an in-vehicle application for teaching, measuring and rewarding a vehicle driver according to this disclosure.

A representative mobile device is shown in FIG. 2. The device 200 comprises a CPU (central processing unit) 202, such as any Intel- or AMD-based chip, computer memory 204, such as RAM, and a drive 206. The device software includes an operating system (e.g., Apple iOS, Google® Android™, or the like) 208, and generic support applications and utilities 3210. The device may also include a graphics processing unit (GPU) 212. In particular, the mobile device also includes a touch-sensing device or interface 214 configured to receive input from a user's touch and to send this information to processor 212. The touch-sensing device typically is a touch screen. The touch-sensing device or interface 214 recognizes touches, as well as the position, motion and magnitude of touches on a touch sensitive surface (gestures). In operation, the touch-sensing device detects and reports the touches to the processor 212, which then interpret the touches in accordance with its programming. The mobile device typically also includes other input/output devices include software-based keyboards, cameras, microphones, and the like.

More generally, the mobile device is any wireless client device, e.g., a cellphone, pager, a personal digital assistant (PDA, e.g., with GPRS NIC), a mobile computer with a smartphone client, or the like. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

Thus, a mobile device as used herein is a 3G—(or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices. The techniques disclosed herein are not limited for use with a mobile device that uses a particular access protocol. The mobile device typically also has support for wireless local area network (WLAN) technologies, such as Wi-Fi. WLAN is based on IEEE 802.11 standards.

The client is not limited to a mobile device, as it may be a conventional laptop or other Internet-accessible machine running a web browser or mobile application (app). Content retrieved to the client may be rendered in a browser, within a mobile app, or other rendering engine.

The client may also be a telematics device installed in the vehicle.

The client also may be integrated into existing in-vehicle devices, such as a fuel mileage gauge in-dash.

Driver Measurement and Incentive System for Improving Fuel-Efficiency

With the above-described enabling technologies, the techniques of this disclosure are now described.

To address the above-described prior art deficiencies, and according to this disclosure, a vehicle driver is provided with a display interface (e.g., a graphical user interface (GUI)) via the smartphone, tablet, PC, or any telematics or in-vehicle device installed in the vehicle. As will be described, the user interface preferably presents a real-time target to follow to maximize fuel economy and safety, achieved by modulating the accelerator pedal appropriately. Preferably, this target is derived via algorithmic techniques (a set of one or more algorithms) that use data from the following one or more input sources: Engine Control Unit (ECU) data including, without limitation, vehicle speed, engine load, engine speed, fuel rate, mass air flow, and the like, third-party supplied data such as temperature, % grade, time of day, and the like, and other (potentially proprietary) data such as driver history, vehicle history, location target, and the like. The one or more algorithms preferably execute in an application running in the mobile device (or other telematics or i-vehicle device). In a preferred embodiment, the application runs on a web-connected mobile device, connected to a motor vehicle's engine control unit (ECU), either wirelessly or via cable (e.g., Ethernet, Firewire, or the like). Using the various data sources described, e.g., data received via the Internet or otherwise (i.e. % grade, driver ID, proprietary data, temperature, and the like), data from the mobile device (i.e. GPS location, time of day, or other data), and data from the ECU (mass air flow, fuel rate, rpm, vehicle speed, or other data), a display is rendered by the device to teach a driver how to move the vehicle in the most efficient and safest manner.

Generalizing, there may be several data sources that may be used to drive the application. These include: first data, which originates in the vehicle itself; second data, which originates externally from the vehicle and represents one or more local (to the vehicle) environmental condition(s) associated with a current operation (real-time, or near real-time) of the vehicle; and third data that is historical in nature and that associates one or more of the following: this particular driver, this particular vehicle, this particular job, and this particular route. The first data is typically derived from the vehicle ECU system but in general may be any data that originates in the vehicle according to one or more of the following industry standards: SAE (Society of Automotive Engineers International) J1939, SAE J1708, SAE J1587, and SAE J1979. The second data typically is one of: time, temperature, percent grade, wind conditions, weather, altitude (from GPS), hill detection, forward looks at the route grade from topological maps, and the like. The third data typically is specific to the driver, vehicle, job and/or route for which the calculation is being generated. The third data may not always be available; when third data is available, it is often useful to seed the calculations, as will be described.

As will be described, an underlying premise of the technique herein is that fuel rate can be approximated as linearly increasing as the vehicle speed increases with all other factors constant. To generate this line of fuel rates versus speeds, events that fall around an acceleration window (typically zero) are collected and used to determine a fitted first order curve. These collected events can be used to generate an assumption of a fuel rate at a predetermined higher speed (typically 65 miles/hour or its km/hour equivalent). Using one or more of the below-described algorithms, this fuel rate is then used to set a fuel rate limit over a full range of vehicle speeds. As more data is collected, this fuel rate is further refined and updated. Initially, this fuel rate is seeded through remote/local database lookups, and it is refined as more data is collected and confidence of the collected data is high (or at or above a configurable threshold). When external data sources are available, the fuel rate is permitted either to rise or fall as a function, for example, of one or more of: grade %, wind speed and direction, vehicle load, driver habits, and typical route speeds and fuel rates for vehicles of the same type.

Preferably, one or more algorithms as described below operate to a target (fuel rate <diesel> or air mass <spark ignition>) for the driver to follow which varies, for example, according to the difficulty of the mission of the vehicle. Furthermore, preferably a score is presented to the driver such that performance can be measured. In another aspect, an indicator is provided in the form of a display pointer relative to other display indicia that guide or coach the driver regarding the operating characteristics (e.g., an amount of throttle) to apply as the vehicle moves along the route. When utilized, the application improves fuel mileage, reduces safety incidents, and helps fleets retain their best drivers, e.g., by facilitating incentive programs. For example, using the application, the driver is scored and earns or loses "points" based upon their performance against the target. On a periodic basis, a score is used to offer the driver an incentive such as a pre-paid credit card.

Figure 3:
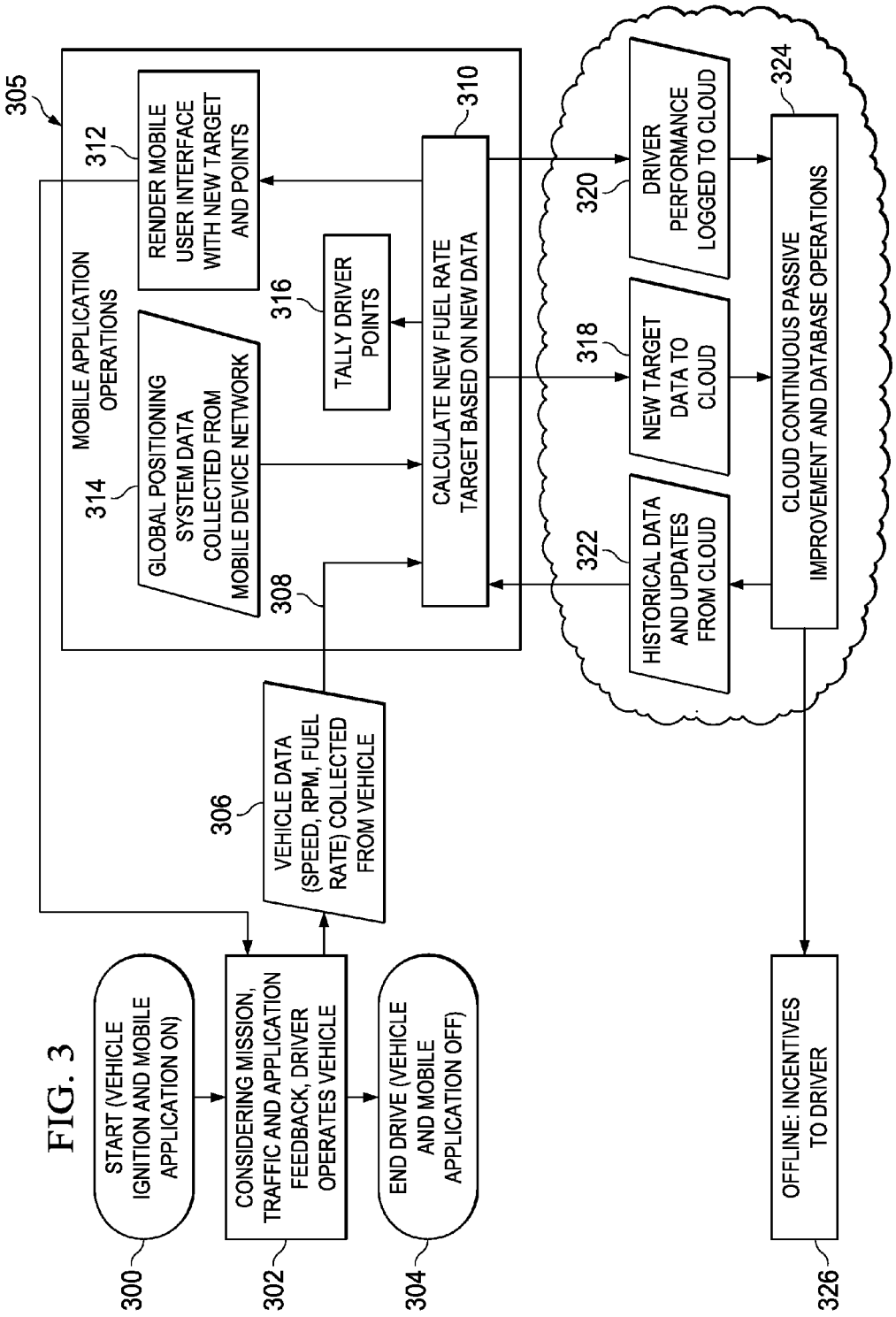
FIG. 3 is a process flow of a driver measurement and incentive process for improving vehicle fuel-efficiency according to the techniques herein.

FIG. 3 illustrates the basic techniques of this disclosure, as have been described above. Typically, there are a set of mobile device-specific operations, and the mobile device may interface to a service provider infrastructure as necessary. As noted above, the display interface preferably is generated by a software application that provides the described functionality (on the driver side), typically using local display resources in the mobile device (depending on the type of device used). The application may be provided by the service provider, by a third party (e.g., an app store), or it may be integrated (or native to, as original-equipment) with an in-vehicle device.

The following describes the basic operating scenario. Typically, the vehicle is a truck driven by an operator (a driver). This is not a limitation, however, as the techniques herein may be implemented in any type of vehicle (including passenger automobiles, boats, aircraft or other machines) whose fuel efficiency may be monitored and in which visual feedback may be provided to an operator of the vehicle during operation. The vehicle may be being driven remotely by an operator, or the technique may be implemented in a "simulated" driving environment (such as in conjunction with a simulator or training device or system). The techniques herein may also be implemented as a training system or tool within a machine or system, e.g., using test or simulated data for the various inputs, to train vehicle operators for when they get out in real-world situations.

For convenience, the application described herein is sometimes referred to as a "coach" or "coaching" application, as it is used to train the operator to use the vehicle pedal more efficiently, thereby improving overall vehicle fuel economy.

In the typical in-vehicle operating scenario, and with reference to FIG. 3, the operator starts the vehicle (at step 300), which activates the coach application. The vehicle is then operated (step 302) with the assistance of the coaching application (as will be described), which application considers the driving mission and operating conditions, traffic conditions and other data, and provides visual and/or aural feedback to the driver. The vehicle is operated under load on a road. When the drive ends, the vehicle is turned off, and the application is closed (step 304). While in motion, various types of vehicle data such as speed, engine RPM, fuel rate, and the like, are collected (step 306). As noted above, typically this is data from the vehicle electronic unit (ECU) and includes vehicle speed, engine speed, engine load, percent torque, fuel rate, air mass, and the like. This data is pushed to the on-board device (e.g., via wireless or cable) (at step 308). The coach application 305 executes as software (a set of computer program instructions) in the mobile device and performs a number of high level operations as depicted. Its primary functions are calculating a target fuel rate based on various data inputs (at step 310), and using the output of this calculation to control rendering of a new target value on a display interface (at step 312). The target fuel rate (or, in the alternative, air mass) calculation preferably also uses GPS data collected from the mobile device network (at step 314). Typically, data from the device (e.g., GPS location) is pushed to the application wirelessly. The output of the calculation may also be used to generate "points" for a driver who complies with the target fuel rate (at step 316).

The service provider, which may be cloud-based as shown, provides and receives various data, and it provides one or more services. Thus, for example, typically the data from the ECU, as well as the output(s) generated by step 310, are provided to the service provider database (e.g., via mobile data connection) (at step 318). Driver performance driver data captured by the coach application is logged to the service provider (at step 320). Historical data and updates as needed are delivered to the coach application (at step 322). For example, the service provider database typically pushes various types of data, e.g., driver history, driver handicap, location difficulty, vehicle handicap, % grade, time of day, traffic, temperature, and the like, to the application. The service provider preferably also executes a cloud-based driver management process and its associated database operations (at 324), which provides driver incentives or other feedback (at step 326).

In one embodiment, the calculation performed at step 310 works generally as follows. In this example scenario, the calculation is executed on-board the mobile device (and, in particular, the coach application executing thereon) runs a routine against all (or some subset of) inputs to determine what the target (e.g., fuel rate, air mass, and the like) should be for this particular driver, this route, this load, and this vehicle. In the alternative, the calculation (or some portion of it) may be executed in the service provider environment, or elsewhere. The device then receives the target value (or values). Using a display interface, the target value is then rendered, preferably in a graphical manner.

Figure 4:
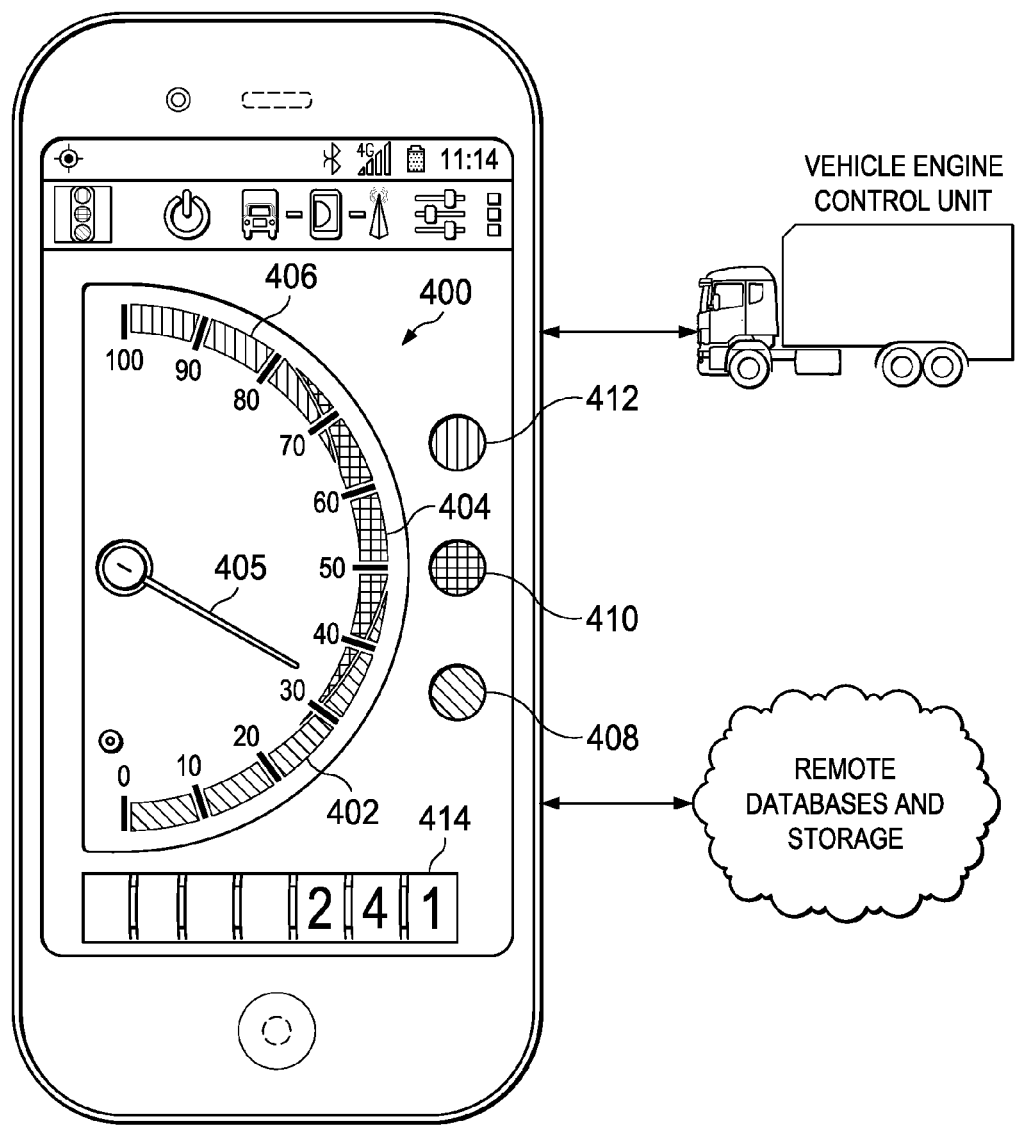
FIG. 4 illustrates a representative client-side user interface (UI) on a mobile device display according to this disclosure.

FIG. 4 illustrates a representative display interface 400 for this purpose. The interface may be generated on the mobile device by the coach application, or the outputs from that application may interface to another display application. The display interface 400 is illustrated as a gauge (to be consistent to a standard in-vehicle display format) that includes a set of spaced values as shown. Preferably, the gauge is semi-circular and includes three (3) or more zones, such as green 402, yellow 404 and red 406. A pointer 405 is driver around the gauge based on the results of the calculation (step 310 in FIG. 3). The display preferably is updated continuously, periodically (e.g., every few seconds), or in some combination thereof. There may be particular driving conditions during which the operation of the display is suspended. Additional operator feedback is provided by a set of lights 408, 410 and 412 (e.g., simulated LEDs), which illuminate green, yellow and red, respectively. The interface also preferably includes a running point meter 414, whose value increases provided the driver maintains the pointer within some acceptable range.

Thus, according to this disclosure, data regarding a specific vehicle class (type) is collected and fuel rate versus vehicle speed evaluated (using some empirical data analysis technique). If other data (e.g., information about the particular driver, specific information about the actual vehicle itself, or the like) is available, that other data may be evaluated as well during this process. During this evaluation, preferably zero acceleration events are filtered out. The zero acceleration events correspond to events when the vehicle is not accelerating or decelerating but, rather, travels at constant speed. While there may be lots of small differences over short periods of time, over a large chunk of data these differences tend to average out and the resulting data points represent a function (in effect, "how much fuel does it take to keep the vehicle at a steady speed"). These zero acceleration fuel rate versus vehicle speed data points form a line. The line is described by y=mx+b, where x=speed, and y=fuel rate. This line represents the amount of fuel needed to keep this type of vehicle at speed assuming ideal conditions (no acceleration, driving on a flat and smooth surface, with no wind, a constant load, etc.). This becomes a "baseline" for the vehicle class. Ideally, any fuel rate below this line for a given speed represents "green" on the display interface gauge. Any fuel rate above this line for a given speed represents "yellow and red" on the gauge. If this optimal rate is held, the resulting curve represents the "green/yellow" transition point for the gauge. Preferably, the application gives drivers a little more room at lower speeds than what is represented on the curve. As an example of this approach, a speed point (e.g., 65 MPH) may be selected and the fuel rate capped with the corresponding fuel rate from the baseline. If the driver uses no more than this fuel rate, the vehicle should be able to achieve a gradual acceleration to that speed and then be able to hold it. If more fuel than that is used, the pointer enters the yellow or red zones. Preferably, the calculations may adjust dynamically for events or occurrences (e.g., hills, head winds, or the like) beyond the driver's control. As additional statistically-relevant fuel rate and speed data points (around zero acceleration) are available, the baseline may be recalculated. Typically, it will be desirable to adjust the baseline based on external data (e.g., hill detection, altitude from GPS, forward looks at the route grade from topological maps) and, if available and statistically-significant, historical information (e.g., about the driver, the vehicle, the driver's past history in the vehicle for the particular route, and so forth).

The display pointer in the gauge may be scaled, e.g., by adjusting a weight to be applied to the difference of the actual fuel rate and the recommended/ideal fuel rate and that comparison to a position of the pointer for feedback to the operator. The display pointer may also be scaled to provide different degrees of difficulty based on a proficiency of the driver; thus, as the driver becomes more proficient, it may be desirable to scale the pointer to increase the difficulty (of maintaining the pointer in the green zone) so that the driver's skills may be further improved using the coaching technique.

The display interface preferably is rendered by the coach application. In an alternative, the gauge, lights and point meter may be virtual (e.g., projected via a heads-up display, Google Glasses™, or the like.

The visual cues may be supplemented (or even replaced) with audible cues, tactile (haptic-based) cues, or some combination(s) thereof. Thus, for example, the mobile device may buzz when the pointer moves out of the green zone, or a signal may be sent to a haptic device embedded in the steering wheel, or the driver's seat, to provide a vibration. Of course, these are merely examples.

The display interface may use other display formats and constructs (e.g., linear scales, numerical read-outs, and the like) in lieu of (or to supplement) the gauge.

The display may be augmented to include other information that may be used in the target calculation.

The application may be configured to present statistics or other reports to the driver upon given occurrences, such as at key-off. Thus, for example, the application may be configured to provide a driver summary and a driver "leaderboard" so that the driver can determine his or her current status with respect to other drivers.

Figure 5:
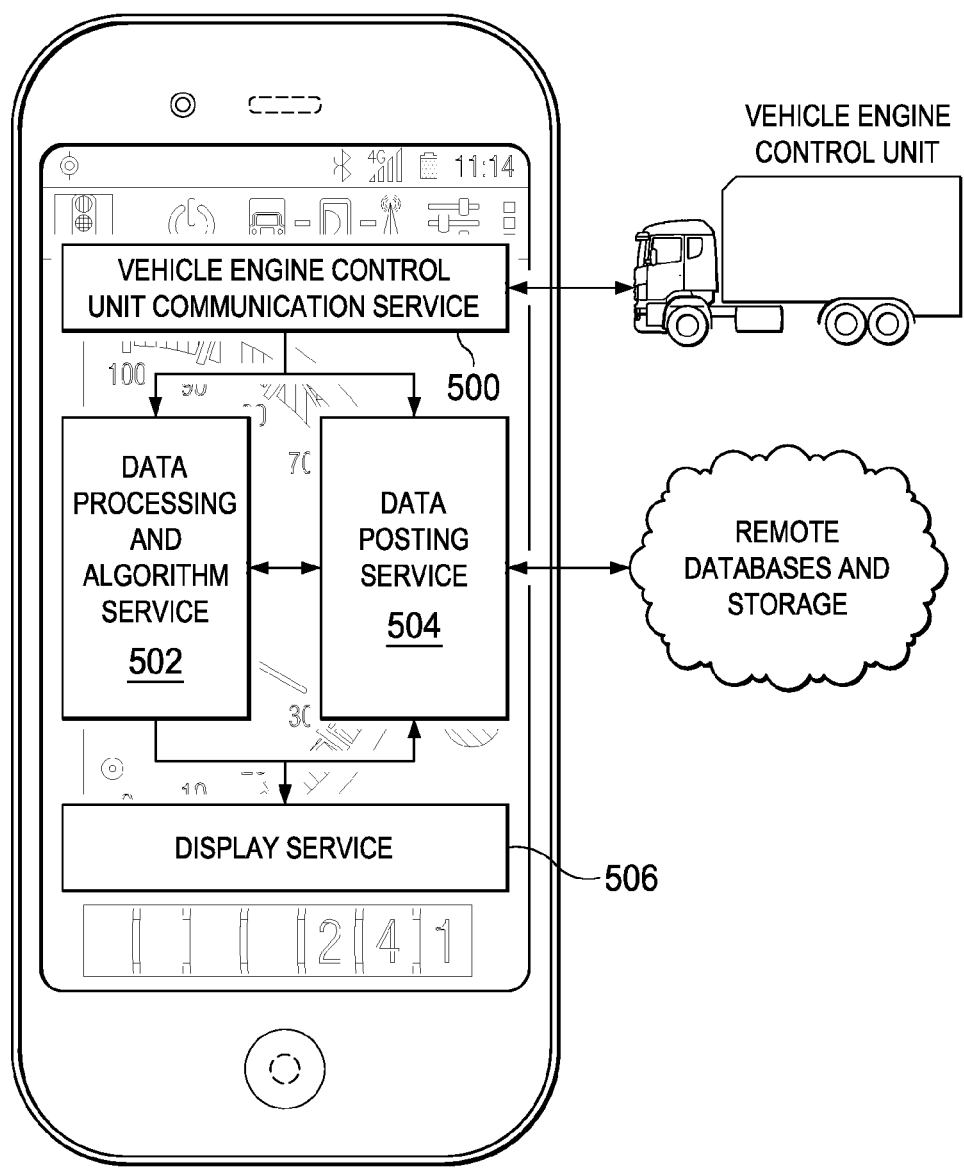
FIG. 5 illustrates a set of software-based services that execute in the coach application of this disclosure.

FIG. 5 illustrates a set of software-based services that execute on the mobile device and comprise the coach application. These include a vehicle ECU communication service 500, a data processing and algorithm service 502, a data posting service 504, and a display service 506. ECU communication service provides the vehicle data for the calculation. The data processing and algorithm service 502 performs the calculations to generate the target data, using data supplied by the ECU communication service 500, as well as data provided from the remote databases and storage and forwarded through the data posting service 504. Data posting service 504 also collects driver performance data and posts it to the service provider databases. The display service 506 takes the outputs generated by the service 502 and uses them to drive the displays, in the manner described.

In operation, the target is calculated (based on the inputs), driver performance against the target is measured, points are accumulated, and scoring presented. The service database logs performance data by the vehicle, by the operator, and by location. Preferably, an incentive program is offered to the driver based upon achievement of a minimum score, e.g., as established by a fleet manager.

To use the system in the vehicle, the driver turns on the mobile device and starts the vehicle. A wireless link is established. The driver preferably drives so as to keep the needle in the "green" zone. Points are then awarded, e.g., based on miles driven in the green zone. Miles driven in the yellow zone may be deemed neutral. However, any excursions into the "red" zone preferably lock-out the point-logging for a given time period (e.g., 10 seconds). As indicated, preferably the score is presented as a percentage, calculated as a number of points per number of miles. The score at the end of a measurement period may then result in an incentive bonus based on the fleet and driver targets. The application is turned off as needed or desired.

The subject matter therein thus provides for a software application intended to run on a network-connected mobile device, and connected to receive data from a motor vehicle's engine control unit (ECU). Using the described data sources (or some subset of them), a target value is generated and an indication is rendered by the device to teach a driver how to move the vehicle in a most-efficient manner. In operation, a calculation executed by the application creates a target (fuel rate <diesel> or air mass <spark ignition>) for the driver to follow, and that target preferably varies according to the difficulty of the mission of the vehicle. Furthermore, a score is presented to the driver such that performance can be measured. Financial or other rewards may be offered to the driver periodically on the basis of these scores. Any type of driver incentive program may be used.

The following provides additional details regarding the calculations that are used to drive the display interface. According to this disclosure, a set of algorithms are used for this purpose. As noted above, an underlying assumption is that the fuel rate to maintain a vehicle at a constant speed, with all other factors (grade %, wind speed, load) constant, should linearly increase as speed increases. Each algorithm typically, without limitation, takes in information from the following sources: vehicle Engine Control Unit (ECU) (namely, one or more of: vehicle speed, fuel rate, engine speed, transmission gear value, brake switch, vehicle identification, and component information), the mobile device itself (e.g., GPS Location, GPS Altitude, accelerometer values, and time/date), and external data sources (e.g., temperature, grade %, vehicle information, driver history, and prior fuel limits). As noted above, the ECU data is gathered using communication methods as defined in the industry standard documents which include, but is not limited to: SAE (Society of Automotive Engineers International) J1939, SAE J1708, SAE J1587, and SAE J1979. Preferably, outputs returned from each algorithm are an instantaneous feedback, typically in the form of a numerical value from 0 to 100% (needle position of the pointer 405) that will reflect a driver's ability to maintain his or her fuel rate (an amount of fuel used per unit time) in an acceptable range determined by the algorithm's fuel rate limit. Along with this feedback, the driver preferably also receives a number of points based upon distance travelled and needle position reference previously. These points are then used as part of the incentive program.

Preferably, there are four (4) distinct algorithms that may be used in various ways, as will be explained. These algorithms are referred to herein for convenience as SB, P, G and B. Generally, some combination of the algorithms is used to develop a fuel rate limit based upon the vehicle, driver, payload and driving environment.

Initial (or default) fuel rate limits, prior to acquiring an adequate data set, may be derived using a local and remote database lookup based upon prior vehicle history using vehicle ECU information including VIN, serial number, model, make, and the like. If this information is unavailable or has not been delivered (by the Vehicle ECU) to the mobile device, logged-in fleet or logged-in driver information may be used to generate fuel rate limits. This is considered the initial seeding, whereby the fuel limit is set on those criteria and then further refined using the algorithms listed below. Some "softening" of the fuel limit may be factored into each limit based upon changing short term environmental conditions, e.g. headwind, crosswind, grade changes. During these events, the application typically allows the driver to maintain his or her current speed or maintain current fuel rate, but typically discourages the driver to accelerate during the events. Of course, the application may always make exceptions in the event of hazardous conditions.

The SB algorithm generates a first order polynomial fitted curve based upon fuel rate and vehicle speed based on acceleration value and transmission gear value. This curve is then used to determine the maximum allowable fuel rate at a given speed. The fuel rate limit can be adjusted based upon a difficulty set for the driver. This difficulty adjusts the zero speed intercept of the fuel limit curve. In a preferred embodiment, this algorithm thus takes in driver, company, ECU vehicle information (e.g., VIN, make, and model) to determine a fuel limit for the driver based upon a database query. It then takes in vehicle speed and fuel rate to generate a needle position for the display gauge, and to collect driver points earned, as well as possible driver points.

The P algorithm determines the maximum allowable acceleration that will not increase trip duration, e.g., based upon the EPA's Federal Test Procedures (FTP) Drive Cycle. This calculation leads to an allowable acceleration value over the speed range of the vehicle. Fuel rate limits are then developed by vehicle speed, fuel rate, engine speed and transmission gear value, preferably to generate a simple regression of the vehicle speed and fuel rate. These limits are then used to generate the three (3) distinct driver feedback zones of fuel rate (green, yellow and red). In this algorithm, the fuel rate limits are allowed to change based upon the statistical deviation from previously-collected data to the current collected data. In a preferred embodiment, this algorithm takes in time, vehicle speed, and fuel consumption to determine a fuel limit based upon the acceleration of the vehicle. It then outputs a needle position for the display gauge, and to collect driver points earned, as well as possible driver points.

The G algorithm stores instantaneous events containing vehicle speed, fuel rate and engine speed to finite sized bins based upon their acceleration and transmission gear value. When a statistically-relevant number of bins are filled, a (least-squares) linear regression is developed using the vehicle speed and fuel rate. This regression is then used to determine the top speed fuel rate, which is used to generate a fuel rate limit. Preferably, these fuel rate limits are continuously updated based upon incoming data and drop out of older, less relevant data samples. In a preferred embodiment, this algorithm takes takes in time, vehicle speed, and fuel consumption to determine a fuel limit based upon acceleration of the vehicle. It then outputs a needle position for the display gauge, and to collect driver points earned, as well as possible driver points.

The B algorithm calculates $\Delta$speed/$\Delta$fuel rate values based upon the instantaneous events of the vehicle with reference to the current acceleration and transmission gear value. The $\Delta$speed/$\Delta$fuel rate value preferably is then cross-referenced to a look up table, either locally or remotely, that stores fuel rate limit curves based upon empirical data analysis of optimum fuel rates for similarly derived $\Delta$speed/$\Delta$fuel rate values. During a typical drive, this number typically updates based upon varying environmental conditions, e.g. change in payload, grade change, and wind direction, which will then reference the lookup table to acquire a more appropriate fuel rate limit. In a preferred embodiment, this algorithm takes in time, vehicle speed, and fuel consumption to determine a slope of fuel consumption and vehicle speed, which is then used to determine a fuel limit based upon a database query. It then outputs a needle position for the display gauge, and to collect driver points earned, as well as possible driver points.

A combination of the described algorithms, or any of them individually, may be used to define the instantaneous fuel limit of the vehicle.

A combination of these algorithms preferably is used to generate the optimum fuel rate limit for the vehicle at any given time. FIG. 6 illustrates representative permutations of the algorithms. As illustrated, in a first embodiment, as represented at 602, algorithm SB is executed initially individually, or more typically, in association with one or more of the other algorithms as shown. In a second embodiment, as represented at 604, algorithm G is executed initially individually, or in association with the SB or P algorithms. A third embodiment, as represented at 606, involves algorithm B being executed initially, either individually or followed by one or more of the algorithms shown. A fourth embodiment, as represented at 606, involves executing algorithm P initially, either by itself or in association with one of the B and SB algorithms. Thus, as indicated, each of the algorithms may be executed either alone or in some combination. Regardless of which algorithm(s) are used, typically the initial seedings (and thereafter updates) come from the vehicle ECU or from data received to the application from remote data sources, as has been described. The one or more algorithms are executed to further and continuously refine the target (fuel rate or air mass) limit that then drives the pointer and other display elements.

The disclosed subject matter provides significant advantages. By deploying the coach application, vehicle fleets radically improve operating costs by lowering overall fuel consumption, reducing insurance premiums, and improving driver retention. The coach application easily integrates with existing smartphone, tablet, and telematics solutions. The described approach is readily implemented so little or no additional workflow is required for a fleet to get started and begin saving.

The coach application provides an in-vehicle cab, real-time user display of fuel mileage performance, thereby enabling immediate coaching on actual fuel used versus the fuel needed to get the job done. If the driver follows the display, he or she saves fuel. The coach application automatically measures, detects and calculates, in real-time or substantially real-time, an optimal setting for the vehicle throttle that adapts to the particular driving job, regardless of vehicle class or load. The display is simple to use and provides a common and well-known metaphor that does not distract the driver. By integrating the application into a conventional smartphone or table, hardware costs for the solution are minimal, and the approach is easy to integrate. The cloud-based data services model enables fleet operators and others who use the system easy and secure access to data, reports, leader-boards, or the like and improves analysis, tracking and reporting.

The approach enables users to save fuel. Visual (and, optionally, audio and/or haptic) cues provide real-time indicators that coach toward ideal fuel performance regardless of truck class or load. The solution engages and centers driver attention on the things that translate to superior safety performance. A by-product is fewer accidents and lower overall operating costs. With the described approach, both drivers and fleet managers have detailed performance data at their fingertips. The data drives win-win incentive plans and reward programs that help improve driver retention.

The described technique (using the one or more algorithms) adapts to varying roads, loads and other factors that are out of the drivers' control to set an efficient target for the driver to follow. Each trip is scored and logged to feed a monthly or quarterly performance-based incentive program.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

What is claimed is as follows:

1. A system to assist an operator to control a vehicle in a fuel-efficient manner, comprising:
   a throttle;
   a mobile device having a display interface; and
   program code operative by a processor during operation of the vehicle for providing visual feedback to the operator with respect to the operator's ability to maintain an indicator in a given position on the display interface, the indicator representing a current fuel rate against a baseline associated with a set of zero acceleration fuel rate versus vehicle speed data points;
   the program code further operative to receive information indicating a change in an amount of throttle applied by the operator, wherein the change in the amount of throttle adjusts fuel consumption by the vehicle.

2. The system as described in claim 1 wherein the program code is further operative to adjust the baseline.

3. The system as described in claim 2 wherein the baseline is adjusted based on one of: time of day, temperature, location, a location difficulty, a percent grade of a road.

4. The system as described in claim 2 wherein the baseline is adjusted based on one of: driver history, a driver identifier, vehicle history, target location, driver handicap, and a vehicle identifier.

5. The system as described in claim 2 wherein the baseline is adjusted using data that originates externally to the vehicle and represents one or more local environmental conditions associated with a current operation of the vehicle.

6. The system as described in claim 1 wherein the display interface comprises two or more target zones that include a first green zone, a second yellow zone, and a third red zone.

7. The system as described in claim 6 wherein the display interface further includes a meter.

8. The system as described in claim 1 wherein the mobile device is one of: a smartphone, a tablet, a personal computer, and an in-vehicle telematics device installed in the vehicle.

9. The system as described in claim 1 wherein the display interface presents a real-time target for the operator to follow to minimize fuel consumption by modulating the throttle.

\* \* \* \* \*